(12) United States Patent
Oota

(10) Patent No.: US 11,531,319 B2
(45) Date of Patent: Dec. 20, 2022

(54) FAILURE PREDICTION DEVICE AND MACHINE LEARNING DEVICE

(71) Applicant: FANUC Corporation, Yamanashi (JP)

(72) Inventor: Yuu Oota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 974 days.

(21) Appl. No.: 16/281,164

(22) Filed: Feb. 21, 2019

(65) Prior Publication Data
US 2019/0258223 A1    Aug. 22, 2019

(30) Foreign Application Priority Data
Feb. 22, 2018  (JP) .............................. JP2018-030108

(51) Int. Cl.
G05B 19/4065 (2006.01)
G05B 19/418 (2006.01)
G06N 20/00 (2019.01)

(52) U.S. Cl.
CPC ..... G05B 19/4065 (2013.01); G05B 19/4183 (2013.01); G06N 20/00 (2019.01)

(58) Field of Classification Search
CPC . G05B 19/4065; G05B 19/4183; G06N 20/00
See application file for complete search history.

(56) References Cited

U.S. PATENT DOCUMENTS

| | | | |
|---|---|---|---|
| 9,537,431 B2 * | 1/2017 | Sawamura | B25J 19/06 |
| 2007/0067678 A1 | 3/2007 | Hosek et al. | |
| 2008/0191654 A1 | 8/2008 | Blanc et al. | |
| 2010/0082267 A1 * | 4/2010 | Schimert | G05B 19/4065 |
| | | | 702/179 |
| 2014/0000355 A1 | 1/2014 | Shikagawa et al. | |
| 2016/0346885 A1 | 12/2016 | Ikai et al. | |
| 2016/0350671 A1 | 12/2016 | Morris, II et al. | |
| 2017/0090430 A1 | 3/2017 | Nakazawa | |
| 2017/0108071 A1 | 4/2017 | Saito et al. | |
| 2017/0154283 A1 | 6/2017 | Kawai et al. | |
| 2017/0293862 A1 | 10/2017 | Kamiya et al. | |
| 2017/0357243 A1 | 12/2017 | Takayama et al. | |
| 2019/0265657 A1 | 8/2019 | Inagaki et al. | |

FOREIGN PATENT DOCUMENTS

| | | | |
|---|---|---|---|
| CN | 101192062 | A | 6/2008 |
| CN | 101263499 | A | 9/2008 |
| CN | 105785916 | A | 7/2016 |
| CN | 106557069 | A | 4/2017 |
| CN | 106815642 | A | 6/2017 |
| CN | 107272586 | A | 10/2017 |
| CN | 107703920 | A | 2/2018 |

(Continued)

*Primary Examiner* — Bryan Bui

(74) *Attorney, Agent, or Firm* — Hauptman Ham, LLP

(57) ABSTRACT

A failure prediction device is provided with a machine learning device configured to learn the state of a brake of a motor with respect to data on the brake. The machine learning device observes brake operating state data indicative of an operating state of the brake when the brake is in a normal state, as state variables representative of a current environmental state, and uses the observed state variables to learn a distribution of the state variables with the brake in the normal state.

15 Claims, 7 Drawing Sheets

(56) References Cited

FOREIGN PATENT DOCUMENTS

| | | |
|---|---|---|
| JP | 2014-10546 A | 1/2014 |
| JP | 2016-101643 A | 6/2016 |
| JP | 2016-226150 A | 12/2016 |
| JP | 2017030137 A | 2/2017 |
| JP | 2017074837 A | 4/2017 |
| JP | 2017120649 A | 7/2017 |
| JP | 2017220111 A | 12/2017 |

* cited by examiner

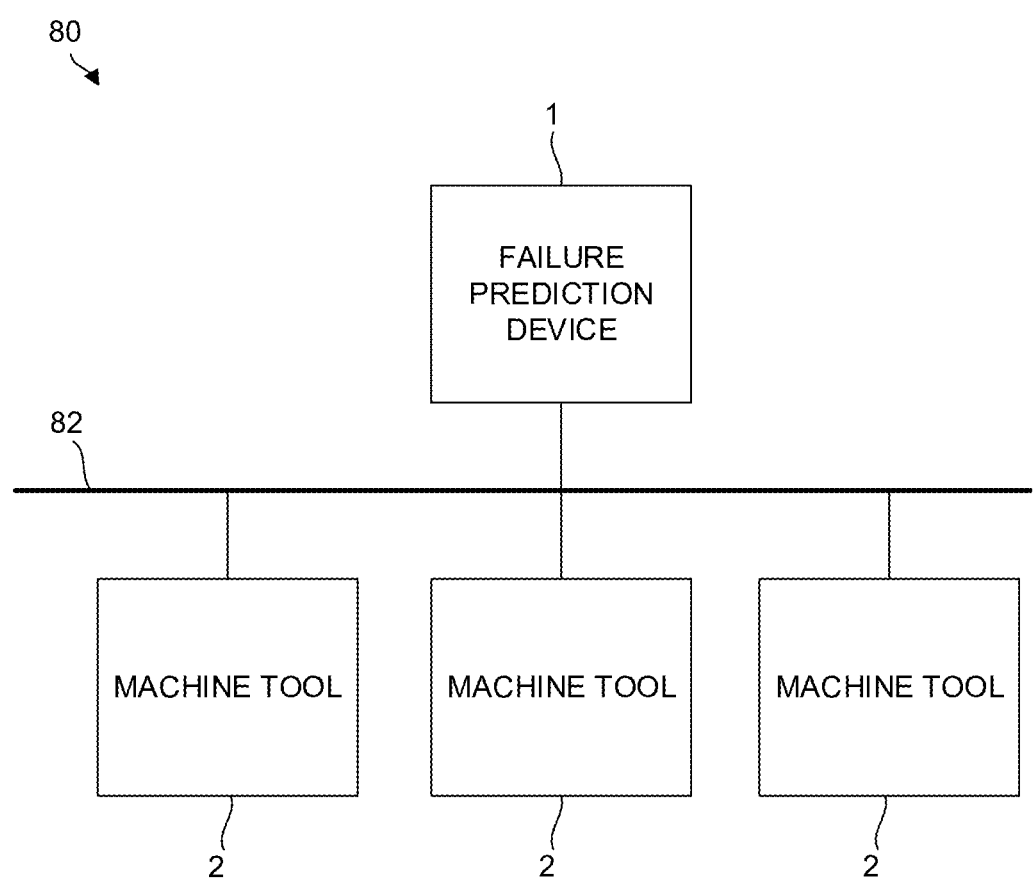

FAILURE PREDICTION DEVICE AND MACHINE LEARNING DEVICE

RELATED APPLICATIONS

The present application claims priority to Japanese Patent Application Number 2018-030108 filed Feb. 22, 2018, the disclosure of which is hereby incorporated by reference herein in its entirety.

BACKGROUND OF THE INVENTION

Field of the Invention

The present invention relates to a failure prediction device configured to predict failure of a brake of a motor and a machine learning device.

Description of the Related Art

A machine such as an industrial robot or machine tool is provided with drive axes for moving members in predetermined directions. For example, the robot has drive axes for driving arms. A joint part between the robot arms corresponds to the drive axis. As the angles of the arms change, the position and attitude of the robot change. In the machine tool, on the other hand, a workpiece and a tool move along a predetermined drive axis, thereby changing the position of the tool relative to the workpiece.

With these drive axes, moving members are driven by a motor. The motor is equipped with a brake for preventing the rotation of its output shaft. In cutting off the power supply to the motor, a brake for maintaining the position and attitude of the robot and those of the tool or a table in the machine tool is activated.

If the motor brake breaks down, the position and attitude of the robot or those of the tool or the table in the machine tool cannot be maintained, so that a problem arises that the robot, machine tool, workpiece, or tool will be damaged. Conventionally, therefore, accidents such as a fall of a gravity axis due to brake failure is prevented by periodically measuring the strength of the brake of the motor (mainly, gravity axis) at preset intervals and urging an operator to replace the motor if the brake is found to be weakened as a result of the measurement (e.g., Japanese Patent Applications Laid-Open Nos. 2016-226150, 2016-101643, and 2014-010546).

However, the conventional technique has a problem that the time of occurrence of failure of the motor brake in the near future cannot be ascertained, even though the failure of the brake can be detected based on the measurement result. Moreover, data (gravity load torque, mechanical friction torque, and reaction time before brake activation) used to measure the braking force of the motor brake vary depending on the temperature and type of the motor and a workpiece attached to the motor. If an attempt is made to predict the failure of the motor brake by using a resulting measured value, therefore, it is difficult to properly set a threshold that determines the level of the measured value at which a sign of abnormality starts to be detected.

Furthermore, as another problem on the prediction of the motor brake failure, although the accuracy of determination of the state of the motor brake can be improved by using detected values measured by a vibration sensor, temperature sensor, and the like, the total cost will increase if the motor brake failure is predicted on the assumption that these sensors are attached to the motor. Thus, in the field of work, it is more preferable that the motor failure can be predicted with some degree of accuracy without using any sensors.

SUMMARY OF THE INVENTION

Accordingly, the object of the present invention is to provide a failure prediction device configured to predict failure of a brake of a motor and a machine learning device.

A failure prediction device according to one embodiment of the present invention solves the above problems by performing machine learning based on a group of irregular measurement data and previously capturing data change that can be assumed to be failure of a motor to predict the motor failure.

Moreover, in a failure prediction device according to another embodiment of the present invention, failure of a motor can be predicted with some degree of accuracy by performing machine learning based on a plurality of measured values obtained from the motor even in an environment where detection values of sensors or the like cannot be obtained.

One form of a failure prediction device according to the present invention is configured to predict the state of failure of a brake of a motor and comprises a machine learning device configured to learn the state of the motor brake based on data on the brake. The machine learning device comprises a state observation unit configured to observe brake operating state data indicative of an operating state of the brake when the brake is in a normal state, as state variables representative of a current environmental state, and a learning unit configured to use the state variables to learn a distribution of the state variables with the brake in the normal state.

The state observation unit may further observe, as the state variables, motor operating state data on an operating state of the motor detected by a sensor.

The state observation unit may observe, as the brake operating state data, at least two of data on a gravity load torque, data on a mechanical friction torque, and data on a brake reaction time.

The state observation unit may further observe motor type data indicative of the type of the motor as the state variables.

Another form of the failure prediction device according to the present invention is configured to predict the state of failure of a brake of a motor and comprises a machine learning device that has learned the state of the motor brake with respect to data on the brake. The machine learning device comprises a state observation unit configured to observe brake operating state data indicative of an operating state of the brake, as state variables representative of a current environmental state, a learning unit that has learned a distribution of the data indicative of the operating state of the brake when the brake is in a normal state, and an estimation result output unit configured to estimate and output the failure state of the brake, based on the state variables observed by the state observation unit and the results of learning by the learning unit.

The state observation unit may further observe, as the state variables, motor operating state data on an operating state of the motor detected by a sensor, and the learning unit may have learned distributions of the data indicative of the operating state of the brake when the brake is in the normal state and the data on the operating state of the motor detected by the sensor.

The state observation unit may observe, as the brake operating state data, at least two of data on a gravity load torque, data on a mechanical friction torque, and data on a brake reaction time, and the learning unit may have learned distributions of the at least two of the data on the gravity load torque, data on the mechanical friction torque, and data on the brake reaction time, as the data indicative of the operating state of the brake when the brake is in the normal state.

Still another form of the failure prediction device according to the present invention is configured to predict the state of failure of a brake of a motor and comprises a machine learning device configured to learn the state of the motor brake based on data on the brake. The machine learning device comprises a state observation unit configured to observe brake operating state data indicative of an operating state of the brake when the brake is in a normal state, as state variables representative of a current environmental state, a label data acquisition unit configured to acquire label data indicative of the failure state of the brake, and a learning unit configured to learn the operating state of the brake and the failure state of the brake in association with each other, using the state variables and the label data.

The learning unit may comprise an error calculation unit configured to calculate an error between a correlation model configured to derive the failure state of the brake from the state variables, based on the state variables and the label data, and a correlation feature identified from teacher data prepared in advance, and a model update part configured to update the correlation model so as to reduce the error.

A further form of the failure prediction device according to the present invention is configured to predict the state of failure of a brake of a motor and comprises a machine learning device that has learned the state of the motor brake with respect to data on the brake. The machine learning device comprises a state observation unit configured to observe brake operating state data indicative of an operating state of the brake, as state variables representative of a current environmental state, a learning unit that has learned the operating state of the brake and the failure state of the brake in association with each other, and an estimation result output unit configured to estimate and output the failure state of the brake, based on the state variables observed by the state observation unit and the results of learning by the learning unit.

One form of a machine learning device according to the present invention is configured to learn the state of a brake of a motor based on data on the brake in order to predict the state of failure of the motor brake, a state observation unit configured to observe brake operating state data indicative of an operating state of the brake when the brake is in a normal state, as state variables representative of a current environmental state, and a learning unit configured to use the state variables to learn a distribution of the state variables with the brake in the normal state.

Another form of the machine learning device according to the present invention has learned the state of a brake of a motor based on data on the brake, in order to predict the state of failure of the motor brake, and comprises a state observation unit configured to observe brake operating state data indicative of an operating state of the brake, as state variables representative of a current environmental state, a learning unit that has learned a distribution of data indicative of the operating state of the brake when the brake is in a normal state, and an estimation result output unit configured to estimate and output the failure state of the brake, based on the state variables observed by the state observation unit and the results of learning by the learning unit.

Still another form of the machine learning device according to the present invention is configured to learn the state of a brake of a motor based on data on the brake, in order to predict the state of failure of the motor brake, and comprises a state observation unit configured to observe brake operating state data indicative of an operating state of the brake when the brake is in a normal state, as state variables representative of a current environmental state, a label data acquisition unit configured to acquire label data indicative of the failure state of the brake, and a learning unit configured to learn the operating state of the brake and the failure state of the brake in association with each other, using the state variables and the label data.

A further form of the machine learning device according to the present invention has learned the state of a brake of a motor based on data on the brake, in order to predict the state of failure of the motor brake, and comprises a state observation unit configured to observe brake operating state data indicative of an operating state of the brake, as state variables representative of a current environmental state, a learning unit that has learned the operating state of the brake and the failure state of the brake in association with each other, and an estimation result output unit configured to estimate and output the failure state of the brake, based on the state variables observed by the state observation unit and the results of learning by the learning unit.

According to the present invention, a machine learning device automatically learns thresholds of failure, so that the failure of a brake of a motor can be predicted with high accuracy according to the operating environment of the motor. Moreover, the failure of the motor brake can be predicted while maintaining some degree of accuracy without using costly sensors or the like.

BRIEF DESCRIPTION OF THE DRAWINGS

FIG. 8 is a schematic functional block diagram showing another form of the system comprising the failure prediction device.

DETAILED DESCRIPTION OF THE PREFERRED EMBODIMENTS

Figure 1:
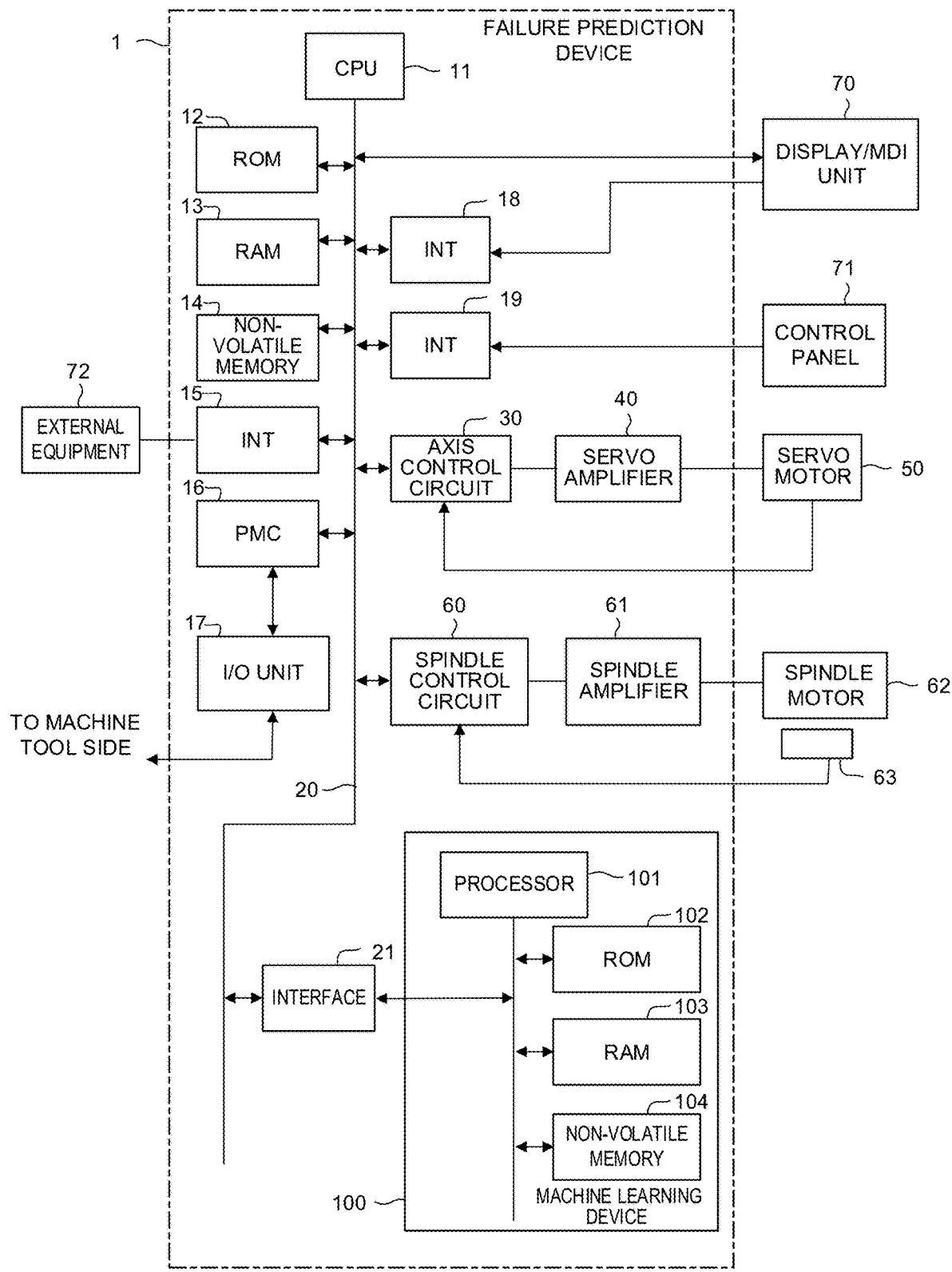
FIG. 1 is a schematic hardware configuration diagram of a failure prediction device according to a first embodiment of the present invention.

FIG. 1 is a schematic hardware configuration diagram showing principal parts of a failure prediction device according to a first embodiment of the present invention.

A failure prediction device 1 can be implemented as a controller for controlling a machine such as a robot or a machine tool, a personal computer installed side by side with the controller for controlling the machine, or a computer such as a cell computer, host computer, or cloud server connected to the controller through a network. FIG. 1 shows the case where the failure prediction device 1 is implemented as the controller for controlling the machine tool.

A CPU 11 of the failure prediction device 1 according to the present embodiment is a processor for generally controlling the failure prediction device 1. The CPU 11 reads out a system program in a ROM 12 through a bus 20 and controls the entire failure prediction device 1 according to this system program. A RAM 13 is temporarily stored with temporary calculation data and display data, various data input by an operator through an input unit (not shown), and the like.

A non-volatile memory 14 is constructed as a memory that is, for example, backed up by a battery (not shown) so that its storage state can be maintained even when the failure prediction device 1 is turned off. The non-volatile memory 14 is stored with machining programs read in from external equipment 72 through an interface 15 and input through a display/MDI unit 70 and various data (e.g., various signals, numerical control information, positions, speeds, and current/voltage values, of a servomotor 50 and a spindle motor 62, detected values of a vibration sensor, temperature sensor, etc., machining conditions, tool and workpiece information, and positions, speeds, and the like of axes of the machine tool) acquired from various parts of the failure prediction device 1 and the machine tool. The machining programs and the various data stored in the non-volatile memory 14 may be expanded in the RAM 13 during execution and use.

Various system programs such as conventional analysis programs (including a system program for controlling exchange with a machine learning device 100 described later) are previously written in the ROM 12.

The interface 15 is an interface for connecting the failure prediction device 1 and the external equipment 72, e.g., an adapter. Programs, various parameters, and the like are read in from the side of the external equipment 72. Moreover, the programs, the various parameters, and the like edited in the failure prediction device 1 can be stored into an external storage means through the external equipment 72. A programmable machine controller (PMC) 16 controls the machine tool and its peripheral devices (e.g., an actuator such as a robot hand for tool change) by outputting signals to them through an I/O unit 17 according to a sequence program incorporated in the failure prediction device 1. Furthermore, on receiving signals from various switches on a control panel on the main body of the machine tool, the PMC 16 performs necessary signal processing and then delivers the processed signals to the CPU 11.

The display/MDI unit 70 is a manual data input device equipped with a display, keyboard and the like, and an interface 18 receives commands and data from the keyboard of the display/MDI unit 70 and delivers them to the CPU 11. An interface 19 is connected to a control panel 71 equipped with a manual pulse generator and the like used to manually drive axes.

An axis control circuit 30 for controlling the axes of the machine tool receives a movement command amount of each axis from the CPU 11 and outputs a command for the axis to a servo amplifier 40. On receiving this command, the servo amplifier 40 drives a servomotor 50 for moving the axes of the machine tool. The servomotor 50 for the axes has a position/speed detector built-in and feeds back a position/speed feedback signal from this position/speed detector to the axis control circuit 30, thereby performing position/speed feedback control.

In the hardware configuration diagram of FIG. 1, the axis control circuit 30, servo amplifier 40, and servomotor 50 are each shown as being only one in number. Actually, however, these elements are provided corresponding in number to the axes of the machine tool to be controlled.

A spindle control circuit 60 receives a spindle rotation command for the manufacturing machine and outputs a spindle speed signal to a spindle amplifier 61. On receiving this spindle speed signal, the spindle amplifier 61 rotates a spindle motor 62 of the manufacturing machine at a commanded rotational speed, thereby driving a tool. A position detector 63 is connected to the spindle motor 62. The position detector 63 outputs feedback pulses in synchronization with the rotation of a spindle and the feedback pulses are read by the CPU 11.

An interface 21 is an interface for connecting the failure prediction device 1 and the machine learning device 100. The machine learning device 100 comprises a processor 101 for controlling the entire machine learning device 100, a ROM 102 stored with system programs, a RAM 103 for temporary storage in each step of processing related to machine learning, and a non-volatile memory 104 used to store learning models and the like. The machine learning device 100 can observe various pieces of information (e.g., various signals, numerical control information, positions, speeds, and current/voltage values, of the servomotor 50 and the spindle motor 62, detected values of the vibration sensor, temperature sensor, etc., machining conditions, tool and workpiece information, and positions, speeds, and the like of the axes of the machine tool) that can be acquired by the failure prediction device 1 through the interface 21. Moreover, the failure prediction device 1 outputs warnings and controls the machine tool, based on the results of estimation of the states of the brakes of the motors, such as the servomotor 50 and the spindle motor 62, output from the machine learning device 100.

Figure 2:
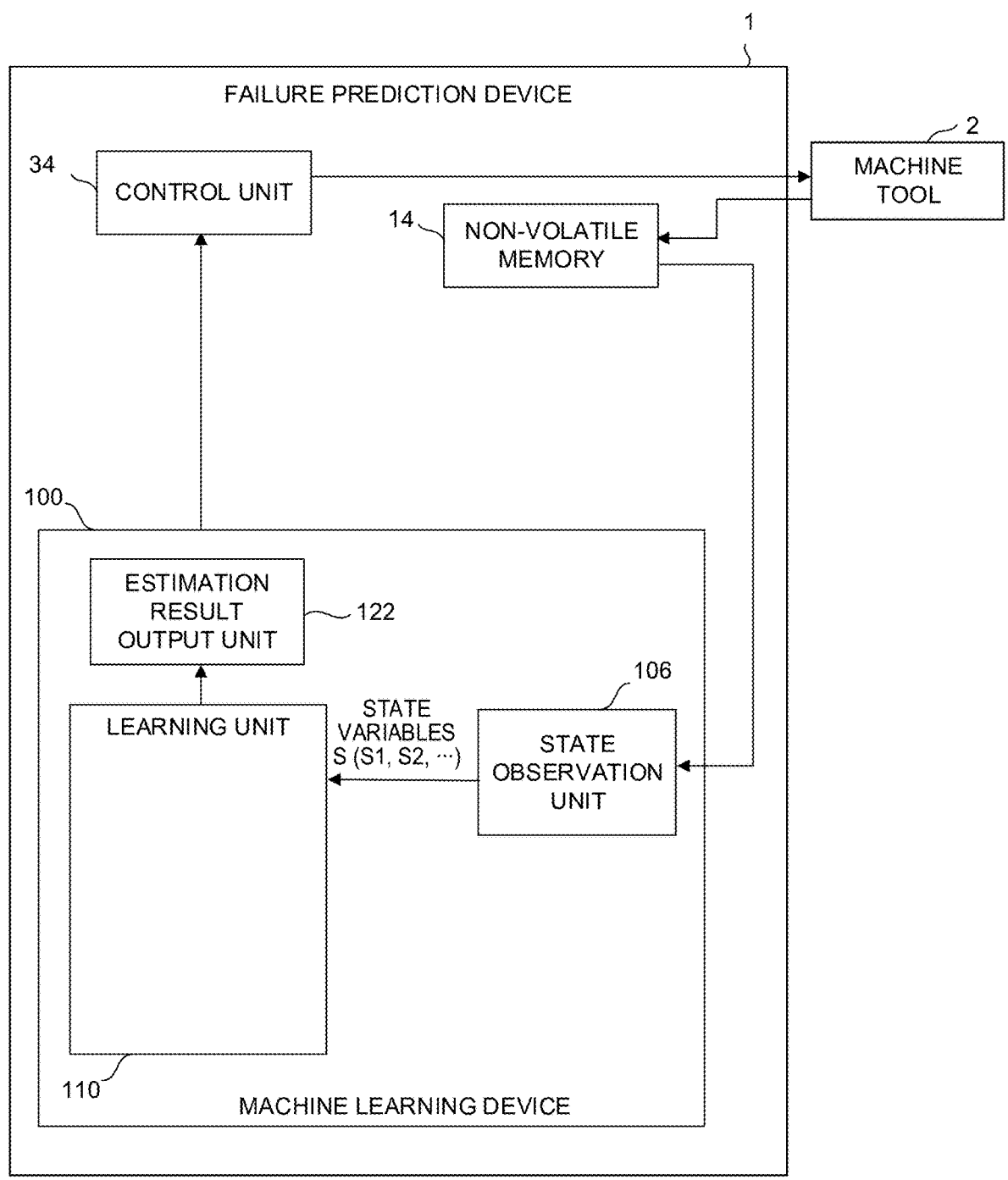
FIG. 2 is a schematic functional block diagram of the failure prediction device of FIG. 1.

FIG. 2 is a schematic functional block diagram of the failure prediction device 1 and the machine learning device 100 according to the first embodiment.

Each of functional blocks shown in FIG. 2 is implemented as the CPU 11 of the failure prediction device 1 and the processor 101 of the machine learning device 100 shown in FIG. 1 execute their respective system programs and control operations of various parts of the failure prediction device 1 and the machine learning device 100.

The failure prediction device 1 of the present embodiment comprises a control unit 34 that outputs warnings and controls a machine tool 2 (or the servomotor 50 and the spindle motor 62 thereof), based on the machining programs stored in the non-volatile memory 14 and the estimation of the states of the brakes of the motors, such as the servomotor 50 and the spindle motor 62, output from the machine learning device 100.

The control unit 34 outputs warnings and performs output stop control of the machine tool 2, based on the estimation of the states of the motor brakes output from the machine learning device 100. The control unit 34 may also be configured to command the machine tool 2 to issue a warning if an estimation that a motor brake is out of order or that a sign of failure of the brake is detected is output from the machine learning device 100 as the estimation of the motor brake state. Moreover, the control unit 34 may also be configured to control the machine tool 2 to stop its machining operation currently in progress if the estimation that the brake is out of order or that a sign of failure of the brake is detected is output from the machine learning device 100 as the estimation of the motor brake state.

On the other hand, the machine learning device 100 of the failure prediction device 1 includes software (a learning algorithm, etc.) and hardware (the processor 101, etc.) for solely learning, by the so-called machine learning, the learning of the state (failure state) of a normal motor brake and the estimation of the failure state of the motor brake. The learning of the state of the normal motor brake is based on data on the operating state of the motor brake, including at least one of data on the gravity load torque, data on the mechanical friction torque, and data on the brake reaction time, and data on the operating state of the motor detected by sensors. The failure state of the motor brake is estimated from input data on the operating state of the brake and the data on the operating state of the motor. What the machine learning device 100 of the failure prediction device 1 learns is equivalent to a model structure representative of the correlation between the data on the respective operating states of the brake and the motor and the failure state of the normal motor brake.

As indicated by the functional blocks in FIG. 2, the machine learning device 100 of the failure prediction device 1 comprises a state observation unit 106, learning unit 110, and estimation result output unit 122. The state observation unit 106 observes state variables S including brake operating state data S1 on the operating state of the motor brake, including at least one of the data on the gravity load torque, data on mechanical friction torque, and data on brake reaction time, and motor operating state data S2 on the operating state of the motor. The learning unit 110 learns the respective operating states of the motor brake and the motor in association with the estimation of the failure state of the motor brake, using the state variables S. The estimation result output unit 122 estimates the failure state of the motor brake from the respective operating states of the motor brake and the motor, using a learned model that has been learned by the learning unit 110.

Among the state variables S observed by the state observation unit 106, the brake operating state data S1 can be acquired from the motor of the machine tool 2 during the braking operation of the motor. The brake operating state data S1 includes at least one of the data on the gravity load torque, data on mechanical friction torque, and data on brake reaction time, which can be calculated based on the motor current value and feedback value. The state observation unit 106 observes data acquired from the motor while the motor is operating normally, as the brake operating state data S1.

Among the state variables S observed by the state observation unit 106, the motor operating state data S2 can be acquired by detecting the operating state of the motor by means of the sensors. For example, a temperature value detected by the temperature sensor during the operation of the motor or a vibration value detected by an acceleration sensor during the motor operation can be used as the motor operating state data S2. While it is necessary to separately attach sensors to the machine tool 2 in order to acquire the motor operating state data S2, the sensors can be used to improve the accuracy of the estimation of the failure state of the motor brake.

The learning unit 110 performs a cluster analysis based on the state variables S (brake operating state data S1 and motor operating state data S2), according to an arbitrary learning algorithm collectively called as the machine learning, and records (or learns) a cluster created by this cluster analysis as the learned model. The learning unit 110 may also be configured to create the cluster based on a predetermined number of state variables S (brake operating state data S1 and motor operating state data S2) acquired while the motor brake is operating normally. For example, data (big data) acquired from the machine tool 2 located in a factory through a wired/wireless network and accumulated may be employed as the state variables S used to create the cluster. By performing this learning, the learning unit 110 analyzes, as a cluster set, distributions of the brake operating state data S1 and the motor operating state data S2 with the motor brake in a normal state.

The estimation result output unit 122 estimates whether the current machining conditions are in a normal or abnormal state, based on the learned model (the cluster set created from the brake operating state data S1 and the motor operating state data S2) learned by the learning unit 110, based on the gravity load torque, mechanical friction torque, and brake reaction time obtained by the machine tool 2 in the normal state, and newly observed brake operating state data S1 and motor operating state data S2.

Figure 3:
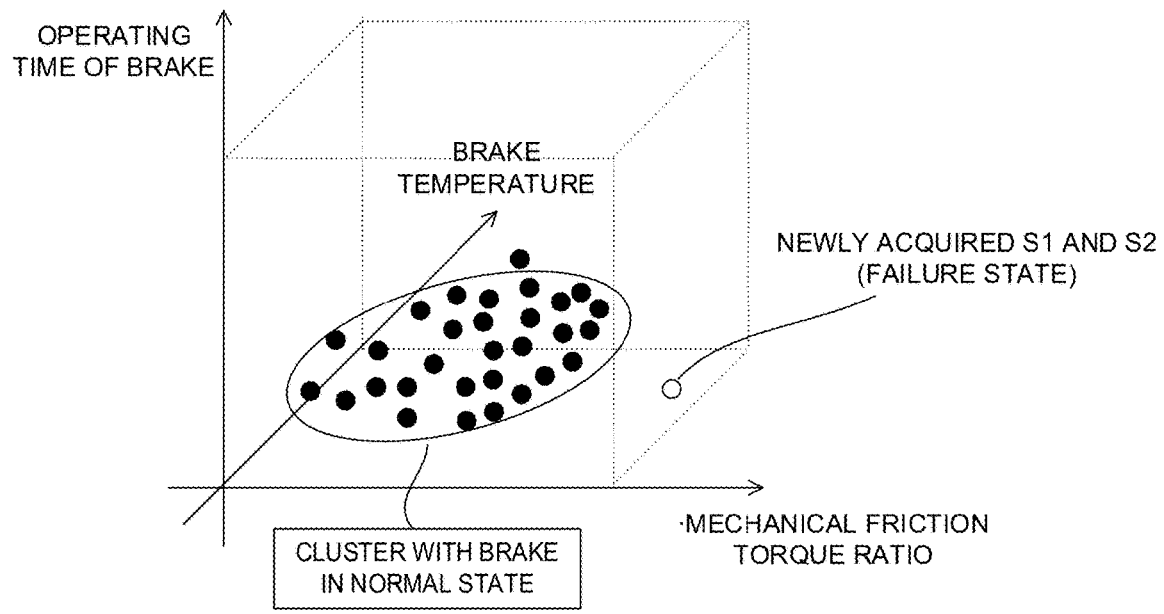
FIG. 3 is a diagram illustrating an example of a cluster analysis performed by a learning unit of the failure prediction device of FIG. 2.

FIG. 3 is a diagram illustrating an example in which the failure state of the brake is estimated based on the cluster set created by the learning unit 110 and the newly acquired brake operating state data S1 and motor operating state data S2. For ease of illustration in FIG. 3, a space on which the data are distributed is assumed to be a three-dimensional space with axes representative of the mechanical friction torque ratio (brake operating state data S1), operating time of a brake (brake operating state data S1), and brake temperature (motor operating state data S2). Actually, however, the data are distributed on a multidimensional space with the data serving as the axes.

As illustrated in FIG. 3, if the brake operating state data S1 and the motor operating state data S2 are newly observed with the cluster created with the brake in the normal state, the estimation result output unit 122 determines whether or not the data belong to the cluster for the case where the motor brake is normal. If the data belong to the cluster concerned, the motor brake state is estimated to be normal. If not, the motor brake state is estimated to be abnormal (or the brake is assumed to be out of order).

Figure 4:
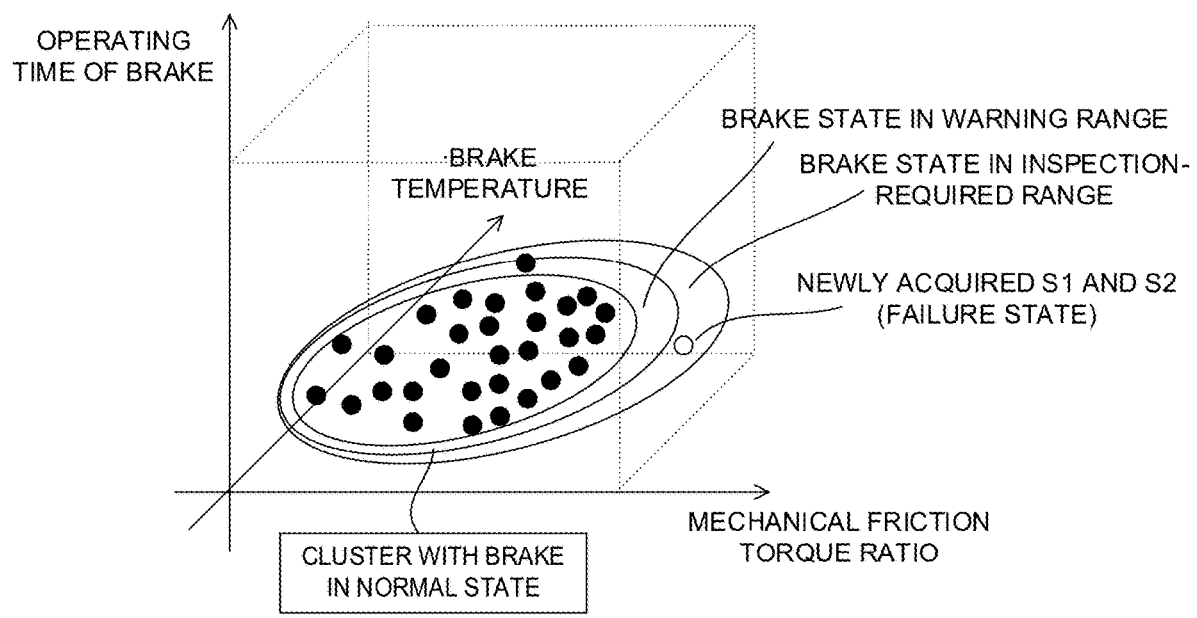
FIG. 4 is a diagram illustrating another example of the cluster analysis performed by the learning unit.

The estimation result output unit 122 may also be configured to not only estimate whether the motor brake is normal or out of order but to estimate stepwise the degree of failure of the motor brake, based on the cluster density of the cluster in the positions of the newly observed brake operating state data S1 and motor operating state data S2 on the cluster space, for the case where the failure state of the brake is normal. In this case, as illustrated FIG. 4, for example, thresholds of the cluster density may be previously set in association with stages indicative of the degree of failure so that the failure state of the motor brake can be estimated stepwise based on the results of comparison between the thresholds and the positions of the newly observed brake operating state data S1 and motor operating state data S2 on the cluster space. In the example shown in FIG. 4, the failure state of the motor brake is estimated in four separate stages; normal, warning (possibility of failure after approximately 100 hours of operation), inspection-required (possibility of failure after approximately 10 hours of operation), and failure. Appropriate values should be previously obtained and set by an experiment or the like for the thresholds of the cluster density used for the estimation of the current state of the motor brake by the estimation result output unit 122.

As described above, if it is possible to automatically estimate without computation or anticipation that the machining operation by the machine tool can be categorized as normal, it can be quickly determined whether or not the machining operation of the currently activated machine tool is normal by only acquiring various data from the machine tool.

As a modification of the machine learning device 100 of the failure prediction device 1, the state observation unit 106 may also be configured to observe at least two of the data on the gravity load torque, data on the mechanical friction torque, and data on the brake reaction time as the brake operating state data S1 after preventing observation of the motor operating state data S2 on the operating state of the motor of the machine tool 2 detected by the sensors. The operating state of the brake may sometimes change depending on the temperature of the motor or the like and its behavior may appear in vibration. It may be feared, therefore, that the accuracy of learning and estimation of the failure state of the motor brake will be reduced by stopping the detection of the motor operating state data S2 by the sensors. By observing, as the brake operating state data S1, at least two of the data on the gravity load torque, data on the mechanical friction torque, and data on the brake reaction time, however, influences of the motor temperature appear as subtle differences between the individual data. Accordingly, a cluster reflective of these differences is created such that the failure state of the motor brake can be learned and estimated with some degree of accuracy. Consequently, moreover, some of the sensors need not be attached to the machine tool 2, so that this configuration is advantageous in cost and the other problem on the prediction of the motor brake failure described before can be solved.

As another modification of the machine learning device 100 of the failure prediction device 1, the state observation unit 106 can further observe motor type data S3 indicative of the motor type. In this case, the learning unit 110 can learn the failure state of the motor brake corresponding to the operating state of the motor brake and the motor type (and the operating state of the motor). On the other hand, the estimation result output unit 122 can estimate the failure state of the motor brake when the operating state of the motor brake and the motor type (and the operating state of the motor) are newly observed.

Figure 5:
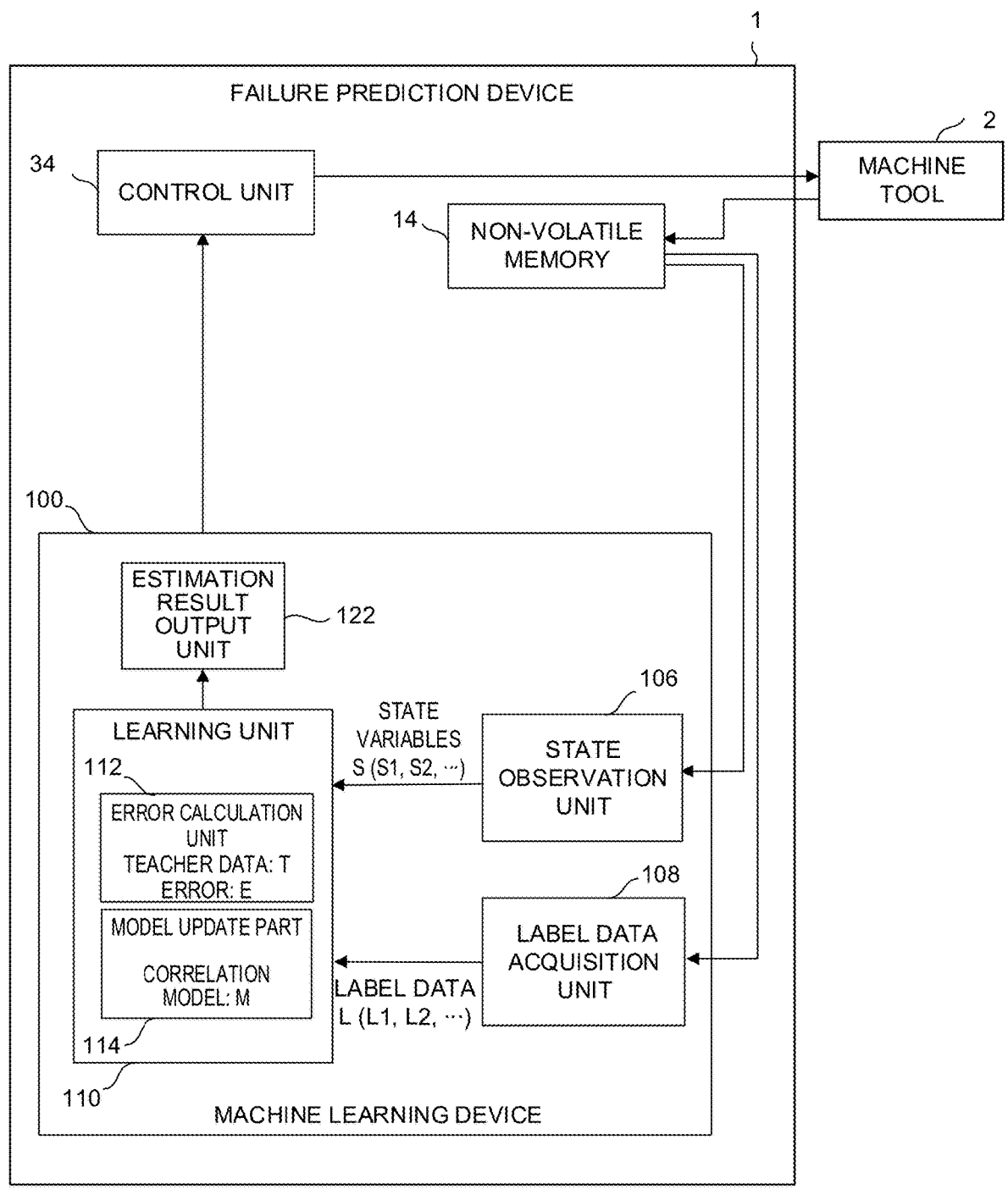
FIG. 5 is a schematic functional block diagram of a failure prediction device according to a second embodiment of the present invention.

FIG. 5 is a schematic functional block diagram of a failure prediction device 1 and a machine learning device 100 according to a second embodiment. Each of functional blocks shown in FIG. 5 is implemented as the CPU 11 of the failure prediction device 1 and the processor 101 of the machine learning device 100 shown in FIG. 1 execute their respective system programs and control operations of various parts of the failure prediction device 1 and the machine learning device 100.

The failure prediction device 1 according to the present embodiment is different from that of the first embodiment in that the machine learning device 100 comprises a label data acquisition unit 108 and that the learning unit 110 performs learning using label data acquired by the label data acquisition unit 108 in addition to the state variables S.

Figure 6:
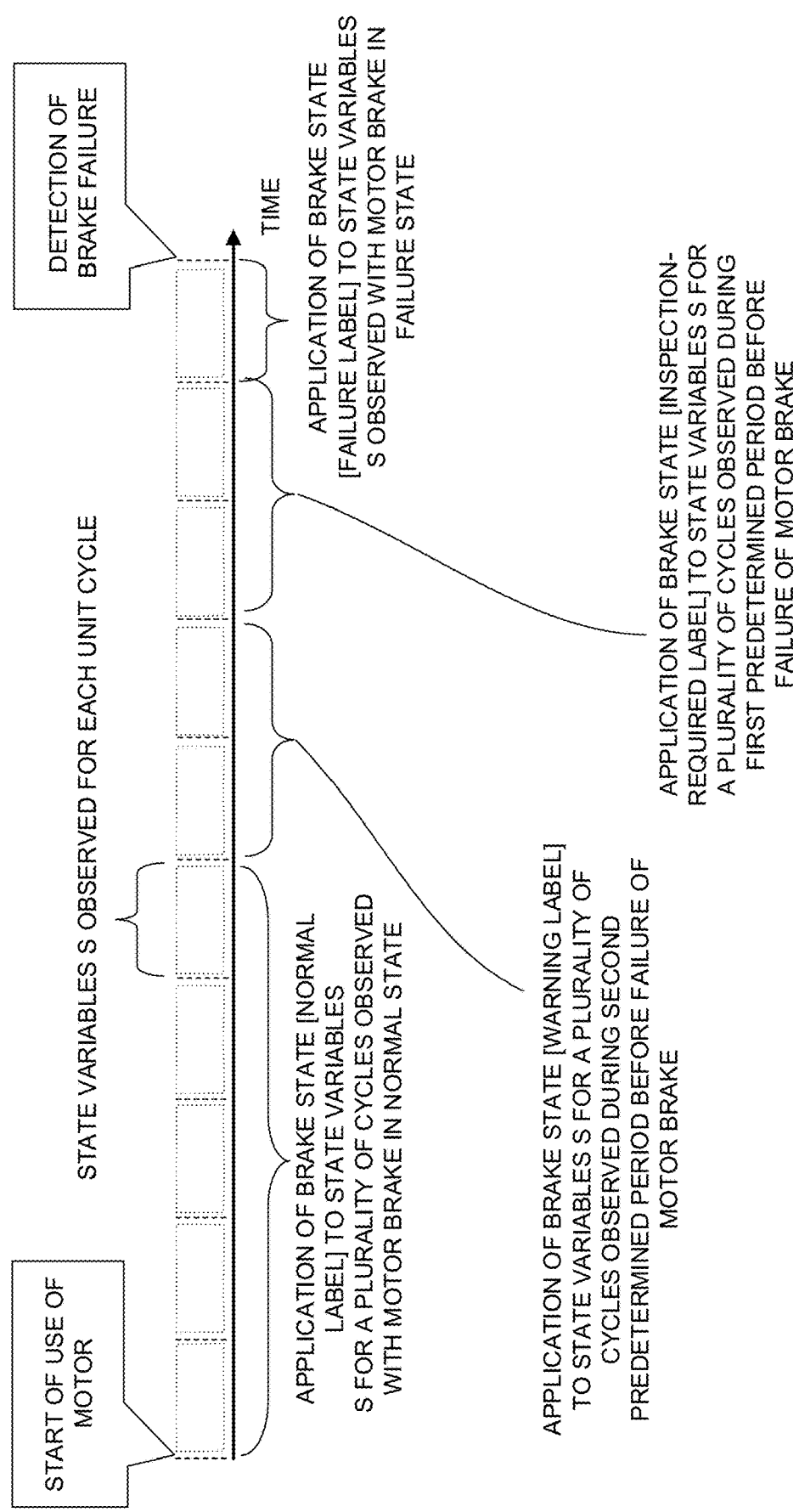
FIG. 6 is a diagram illustrating a method of acquiring label data.

The label data acquisition unit 108 acquires label data L that include brake failure state data L1 indicative of whether the currently activated motor brake is in a normal state or a failure state. As illustrated in FIG. 6, for example, if failure of the motor brake is detected (and when the results of the detection are input to the failure prediction device 1), the label data acquisition unit 108 affixes a label indicating that the motor brake is in the failure state to those state variables S obtained immediately before the detection of the failure, among state variables S recorded as log data in the nonvolatile memory 14 or a host computer connected through the wired/wireless network. Moreover, the label data acquisition unit 108 affixes a label indicating requirement of inspection to those state variables S observed during a first predetermined period before the detection, affixes a warning label to those state variables S observed during a second predetermined period before the first predetermined period, and affixes a label indicating normality to the remaining state variables S. Then, the label data acquisition unit 108 acquires these labels as the brake failure state data L1. After the learning (or construction of the learned model) by the learning unit 110 is completed, the label data acquisition unit 108 is not an essential structure for the machine learning device 100.

The learning unit 110 performs the so-called supervised learning based on the state variables S (brake operating state data S1, etc.) and the label data L (brake failure state data L1), according to the arbitrary learning algorithm collectively called as the machine learning, and constructs (or learns) the learned model. The supervised learning is a method in which a known dataset (called teacher data) of an input (state variables S) and its corresponding output (label data L) is given and a correlation model for estimating a necessary output for a new input is learned by identifying a feature suggestive of the correlation between the input and the output from the teacher data. The learning algorithm of the supervised learning performed by the learning unit 110 is not particularly limited, and a conventional learning algorithm can be used for the machine learning.

In the machine learning device 100 of the failure prediction device 1 shown in FIG. 5, the learning unit 110 comprises an error calculation unit 112 and a model update part 114. The error calculation unit 112 calculates an error E between a correlation model M for estimating the failure state of the motor brake from the state variables S (gravity load torque, mechanical friction torque, brake reaction time, motor operating state detected as required by the sensors, etc.) observed from the machine tool 2 and a correlation feature identified from teacher data T obtained from the observed state variables S and the failure state of the motor brake. The model update part 114 updates the correlation model M so as to reduce the error E. The learning unit 110 learns the estimation of the failure state of the motor brake from the state variables S as the model update part 114 repeats updating the correlation model M.

An initial value of the correlation model M is represented, for example, by simplifying (e.g., by a linear function) the correlation between the state variables S and the label data L and is given to the learning unit 110 before the start of the supervised learning. According to the present invention, the state variables S observed in the past as described before and the failure state of the motor brake can be used for the teacher data T and are given to the learning unit 110 during the operation of the failure prediction device 1. The error calculation unit 112 identifies a correlation feature suggestive of the correlation between the state variables S and the failure state of the motor brake by the teacher data T given as required to the learning unit 110, thereby obtaining the error E between the correlation feature and the correlation model M corresponding to the state variables S and the label data L in the current state. The model update part 114 updates the correlation model M so as to reduce the error E according to, for example, predetermined update rules.

In the next learning cycle, the error calculation unit 112 estimates the failure state of the motor brake by using state variables S according to the updated correlation model M, thereby obtaining the error E between the results of the estimation and the actually acquired label data L, whereupon the model update part 114 updates the correlation model M again. In this way, the correlation between the current environmental state that has so far been unknown and the estimation thereof is gradually revealed. After the learning (or construction of the learned model) by the learning unit 110 is completed, the error calculation unit 112 is not an essential structure for the learning unit 110.

The estimation result output unit 122 estimates the failure state of the currently activated motor brake based on the state variables S (brake operating state data S1, etc.) acquired from the machine tool 2, using the learned model that has been constructed (or learned) by the learning unit 110 based on the state variables S and the label data L.

Also in the present embodiment, as in the modification described in connection with the first embodiment, various combinations of state variables can be employed.

Figure 7:
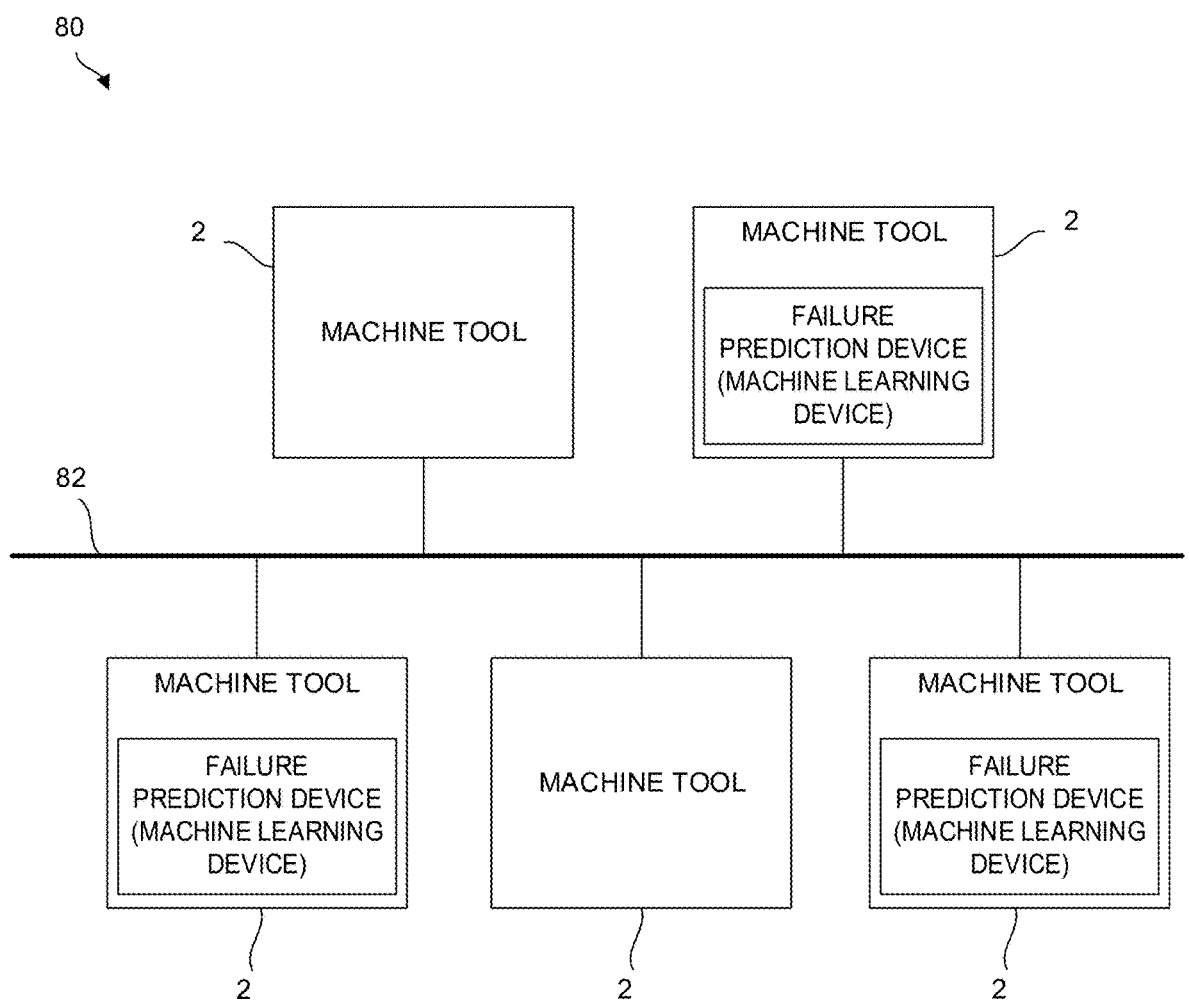
FIG. 7 is a schematic functional block diagram showing one form of a system comprising the failure prediction device.

FIG. 7 shows a system 80 according to one embodiment equipped with machine tools 2. The system 80 comprises a plurality of machine tools 2 with the same mechanical structure and a network 82 that connects these machine tools 2 to one another. At least one of the machine tools 2 is constructed as the machine tool 2 of the failure prediction device 1. The machine tools 2 have the same structure of conventional machine tools required for workpiece machining.

The system 80 having the above structure can automatically and accurately determine, without depending on computation or estimation, whether the machine tool 2 including the failure prediction device 1, among the plurality of machine tools 2, is normally operating or not with respect to individual data detected from the machine tools 2 (including the machine tools 2 without the failure prediction device 1), using the results of the learning by the learning unit 110. Moreover, the failure prediction device 1 of at least one of the machine tools 2 can be constructed so that it can perform learning common to all the machine tools 2, based on the state variables S obtained individually for the other machine tools 2, and that all the machine tools 2 share the results of the learning in common. Thus, according to the system 80, the speed and reliability of the learning of the individual data detected from the machine tools 2 can be improved with a wider variety of data sets (including the state variables S and the label data L).

FIG. 8 shows a system 80 according to another embodiment equipped with machine tools 2. The system 80 comprises a failure prediction device 1, a plurality of machine tools 2 with the same mechanical structure, and a network 82 that connects these machine tools 2 and the failure prediction device 1 to one another. The failure prediction device 1 of the present embodiment can be assumed to be implemented as a computer, such as a cell computer, host computer, or cloud server, for example.

The system 80 having the above structure can learn the individual data detected from the normally operated machine tools, which are common to all the machine tools 2, based on the state variables S (and the label data L) obtained individually for the machine tools 2, and automatically and accurately determine, without depending on computation or estimation, whether or not the motor brake of each machine tool 2 is normally operating or not, with respect to the individual data detected from the machine tools 2, using the results of the learning. According to this configuration, required number of machine tools 2 can be connected to the failure prediction device 1 at any required time without regard to the place and time for the presence of the individual machine tools 2.

While embodiments of the present invention have been described herein, the invention is not limited to the above-described embodiments and may be suitably modified and embodied in various forms.

For example, the learning algorithm and the calculation algorithm executed by the machine learning device 100, the control algorithm executed by the failure prediction device 1, and the like are not limited to those described above, and various algorithms are available.

The invention claimed is:

1. A machine learning device configured to learn a state of a brake of a motor based on data on the brake, the machine learning device comprising:
    a state observation unit configured to observe brake operating state data indicative of an operating state of the brake when the brake is in a normal state, as state variables representative of a current environmental state;
    a learning unit configured to
        perform a cluster analysis based on the state variables to learn a distribution of the state variables with the brake in the normal state, and
        record a cluster learned by the cluster analysis as a learned model configured to predict a failure state of the brake of the motor,
    wherein an operation of a machine having the motor is controlled to be stopped in response to a prediction of the failure state of the brake based on the learned model, and
    wherein the brake operating state data includes at least one of
        1) data on a gravity load torque,
        2) data on a mechanical friction torque, or
        3) data on a brake reaction time.

2. A failure prediction device configured to predict the state of failure of a brake of a motor, the failure prediction device comprising:
    a machine learning device according to claim 1.

3. The failure prediction device according to claim 2, wherein the state observation unit is further configured to observe, as the state variables, motor operating state data on an operating state of the motor detected by a sensor.

4. The failure prediction device according to claim 2, wherein the state observation unit is configured to observe, as the brake operating state data, at least two of the data on the gravity load torque, the data on the mechanical friction torque, and the data on the brake reaction time.

5. The failure prediction device according to claim 2, wherein the state observation unit is further configured to observe motor type data indicative of a type of the motor as the state variables.

6. A machine learning device that has learned a state of a brake of a motor based on data on the brake, the machine learning device comprising:
    a state observation unit configured to observe brake operating state data indicative of an operating state of the brake, as state variables representative of a current environmental state;
    a learning unit that has learned a distribution of data indicative of the operating state of the brake when the brake is in a normal state by
        performing a cluster analysis based on the state variables to learn the distribution of data, and
        recording a cluster learned by the cluster analysis as a learned model; and
    an estimation result output unit configured to estimate and output a failure state of the brake, based on the state variables observed by the state observation unit and the learned model,
    wherein an operation of a machine having the motor is controlled to be stopped in response to the failure state of the brake output by the estimation result output unit, and wherein the brake operating state data includes at least one of
1) data on a gravity load torque,
2) data on a mechanical friction torque, or
3) data on a brake reaction time.

7. A failure prediction device configured to predict the state of failure of a brake of a motor, the failure prediction device comprising:
a machine learning device according to claim 6.

8. The failure prediction device according to claim 7, wherein
the state observation unit is further configured to observe, as the state variables, motor operating state data on an operating state of the motor detected by a sensor, and
the learning unit has learned distributions of the data indicative of the operating state of the brake when the brake is in the normal state and the data on the operating state of the motor detected by the sensor.

9. The failure prediction device according to claim 7, wherein
the state observation unit is configured to observe, as the brake operating state data, at least two of the data on the gravity load torque, the data on the mechanical friction torque, and the data on the brake reaction time, and
the learning unit has learned distributions of the at least two of the data on the gravity load torque, the data on the mechanical friction torque, and the data on the brake reaction time, as the data indicative of the operating state of the brake when the brake is in the normal state.

10. A machine learning device configured to learn a state of a brake of a motor based on data on the brake, the machine learning device comprising:
a state observation unit configured to observe brake operating state data indicative of an operating state of the brake, as state variables representative of a current environmental state;
a label data acquisition unit configured to acquire label data indicative of a failure state of the brake; and
a learning unit configured to learn the operating state of the brake and the failure state of the brake in association with each other, using the state variables and the label data, wherein the learning unit comprises:
an error calculation unit configured to calculate an error between (i) a correlation model configured to derive the failure state of the brake from the state variables, based on the state variables and the label data, and (ii) a correlation feature identified from teacher data prepared in advance; and
a model update part configured to update the correlation model so as to reduce the error,
wherein an operation of a machine having the motor is controlled to be stopped in response to a prediction of the failure state of the brake based on the correlation model.

11. A failure prediction device configured to predict the state of failure of a brake of a motor, the failure prediction device comprising:
a machine learning device according to claim 10.

12. The machine learning device according to claim 10, wherein the brake operating state data includes at least one of
1) data on a gravity load torque,
2) data on a mechanical friction torque, or
3) data on a brake reaction time.

13. A machine learning device that has learned a state of a brake of a motor based on data on the brake, the machine learning device comprising:
a state observation unit configured to observe brake operating state data indicative of an operating state of the brake, as state variables representative of a current environmental state;
a learning unit that has learned the operating state of the brake and a failure state of the brake in association with each other, wherein the learning unit comprises:
an error calculation unit configured to calculate an error between (i) a correlation model configured to derive the failure state of the brake from the state variables, based on the state variables and the label data, and (ii) a correlation feature identified from teacher data prepared in advance; and
a model update part configured to update the correlation model so as to reduce the error; and
an estimation result output unit configured to estimate and output the failure state of the brake, based on the state variables observed by the state observation unit and the correlation model learned by the learning unit,
wherein an operation of a machine having the motor is controlled to be stopped in response to the failure state of the brake output by the estimation result output unit.

14. A failure prediction device configured to predict the state of failure of a brake of a motor, the failure prediction device comprising:
a machine learning device according to claim 13.

15. The machine learning device according to claim 13, wherein the brake operating state data includes at least one of
1) data on a gravity load torque,
2) data on a mechanical friction torque, or
3) data on a brake reaction time.

* * * * *